United States Patent
Chen

(10) Patent No.: US 8,799,519 B2
(45) Date of Patent: Aug. 5, 2014

(54) NETWORK-TO-NETWORK BRIDGE

(75) Inventor: Shih-Jui Chen, New Taipei (TW)

(73) Assignee: Via Technologies, Inc., New Taipei (TW)

(*) Notice: Subject to any disclaimer, the term of this patent is extended or adjusted under 35 U.S.C. 154(b) by 102 days.

(21) Appl. No.: 13/535,210

(22) Filed: Jun. 27, 2012

(65) Prior Publication Data

US 2012/0331179 A1 Dec. 27, 2012

Related U.S. Application Data

(60) Provisional application No. 61/501,713, filed on Jun. 27, 2011.

(30) Foreign Application Priority Data

Jun. 11, 2012 (TW) .............................. 101120856 A

(51) Int. Cl.
*G06F 15/16* (2006.01)
(52) U.S. Cl.
USPC .......................................... 709/249; 370/285
(58) Field of Classification Search
USPC .................. 709/200–202, 249, 228; 370/285
See application file for complete search history.

(56) References Cited

U.S. PATENT DOCUMENTS

| 7,734,859 | B2 | 6/2010 | Daniel et al. | |
|---|---|---|---|---|
| 8,116,309 | B2 * | 2/2012 | Sharma | 370/389 |
| 2007/0211746 | A1 | 9/2007 | Oshikiri et al. | |
| 2008/0056277 | A1 * | 3/2008 | Sharma | 370/395.53 |
| 2010/0115174 | A1 | 5/2010 | Akyol et al. | |
| 2011/0206051 | A1 * | 8/2011 | Suzuki | 370/392 |
| 2011/0310907 | A1 * | 12/2011 | Klein et al. | 370/401 |
| 2012/0113990 | A1 * | 5/2012 | Sharma | 370/392 |
| 2012/0163388 | A1 * | 6/2012 | Goel et al. | 370/395.53 |

* cited by examiner

*Primary Examiner* — Moustafa M Meky
(74) *Attorney, Agent, or Firm* — McClure, Qualey & Rodack, LLP

(57) ABSTRACT

A network-to-network bridge is provided. In one embodiment, the network-to-network bridge is coupled between a main system and a subsystem system. The main system includes a slot to couple with the subsystem, wherein the slot complies with the PCIe standard. The network-to-network bridge includes a transport layer and an internet layer but lacks of a network access layer allocated between the first main system and subsystem so as to transfer data by following the PCIe standard therebetween. The network-to-network bridge transfers data between the main system and the subsystem by accessing and employing their MAC addresses, and the network-to-network bridge can be allocated in the mainboard of the main system or the subsystem.

14 Claims, 10 Drawing Sheets

NETWORK-TO-NETWORK BRIDGE

CROSS REFERENCE TO RELATED APPLICATIONS

This application claims the benefits of U.S. Provisional Application No. 61/501,713, filed on Jun. 27, 2011 and TW patent application No. 101120856, filed on Jun. 11, 2012, the entireties of which are incorporated by reference herein.

BACKGROUND OF THE INVENTION

1. Field of the Invention

The invention relates to computer network, and more particularly to a computer network with a transmission layer and an Internet layer but without a network access layer shared between computer systems.

2. Description of the Related Art

Ordinarily, a computer system is connected to a server via an Ethernet. Basically, the connection between the computer and the server may be a one-to-one connection or one-to-multiple connection. Referring to FIG. 1A, a schematic diagram of a computer system 120 and a server 110 with a one-to-one connection is shown. Referring to FIG. 1B, a schematic diagram of a plurality of computer systems 182, 184, and 186 and a server 160 under a one-to-multiple connection is shown. A network switch 170 delivers network packets sent between the computer systems 182, 184, and 186 and the server 160.

Because the computer system, the server, and the network switch respectively need a network adapter for transmitting/receiving network packets to/from a network connection, the performance of a network access layer of the network adapter is thus becoming the bottleneck limiting the data transmission rate. In addition, the data transmission rate is also limited to the lowest data transmission/receiving rate because two transmission terminals will follow the same transmission rate to exchange network packets. For example, if the server 110 shown in FIG. 1A has a data transmission/receiving rate of 10 GB/s, and the computer 120 has a data transmission/receiving rate of 10 MB/s, the network connection between the server 110 and the computer 120 will follow a data transmission/receiving rate of 10 MB/s. Similarly, if the server 160 and network switch 170 in FIG. 1B both have a 10 GB/s data transmission/receiving rate, and the computer 182 has a 10 MB/s data transmission/receiving rate, the network connection between the server 160 and the computer 182 will thus have a data transmission/receiving rate of 10 MB/s. Obviously, the network transmission rate will be limited by the network adapter which owns the lowest transmission rate among network adapters in the network connection. Practically, the total transmission rate will be lower than the aforementioned because there is additional time-cost for packet error detections.

Since current network data transmission must comply with specifications of the TCP/IP standard, a data transmitter must execute a software application to encapsulate data as network packets according to the TCP/IP model (comprising an internet layer, a transport layer, and an application layer which are all above the network access layer), and send the encapsulated packets to a data receiver via the network access layer. After the encapsulated packets are received, the data receiver then decapsulates the encapsulated packets to recover data by following the TCP/IP standard. An OSI model comprises a physical layer, a data-link layer, an Internet layer, a transport layer, a session layer, a presentation layer, and an application layer is also employed in modern network connections. According to the TCP/IP model, the application layer, the presentation layer, and the session layer of the OSI model are combined as an application layer of the TCP/IP model, and the physical layer and the data link layer of the OSI model are combined as a network access layer of the TCP/IP model.

Referring to FIG. 2, a schematic diagram of network adapters 210 and 250 on two terminals of a network connection is shown. A system A is connected to an Ethernet cable 260 via a network adapter 210, and a system B is connected to the Ethernet cable 260 via a network adapter 250. When the system A wants to transmit data to the system B, the network adapter 210 receives data from the system A and encapsulate data as packets with the definitions of the application layer 221, the transport layer 222, the Internet layer 223, and the network access layer 224, and then transmits the packets to the Ethernet cable 260 via the transmission terminal Tx. After the network adapter 250 receives the encapsulated packets from the Ethernet cable 260 via a receiving terminal Rx, the encapsulated packets are then recovered as data in the system B by performing sequential decapsulation operations by following the definitions of the network access layer 274, the Internet layer 273, the transport layer 272, and the application layer 271.

The network structure shown in FIG. 2 has been broadly used in modern network transmission systems. However, such a structure is becoming inefficiency for cloud computing or wireless communication base stations/server rooms because those servers therein are requested to provide more and more services. Usually, a conventional server comprises a main system and at least one subsystem, and the main system and the subsystem are computer systems which independently operate. After a request from a client is received, the main system may assign one of the subsystems to manipulate this client request according to service type. For example, the main system 160 shown in FIG. 1B is connected to the subsystems 182, 184, and 186 via the Ethernet. After a client request is received by the main system 160, the client request is processed by the subsystems 182, 184, or 186, and the processed data generated by the subsystems 182, 184, or 186 are fed back to the main system 160 via the Ethernet. As aforementioned, the transmission rate and error detection operations of the network access layer affect the system efficiency, and a lot of packet encapsulation and decapsulation operations performed within the neighboring main system and subsystems significantly cause delays to the transmission rate of the entire system. Thus, a new network adapter design is needed to increase the data transmission rate of a network connection.

BRIEF SUMMARY OF THE INVENTION

The invention provides a network-to-network bridge. In one embodiment, the network-to-network bridge, coupled between a first system and a second system, comprises a first network adapter and a second network adapter. The first network adapter comprises a first bus interface and a first network processing stack, wherein the first bus interface receives first data from the first system, and the first network processing stack encapsulates the first data as a first encapsulated data. The second network adapter comprises a second bus interface and a second network processing stack, wherein the second network processing stack takes the first encapsulated data as first decapsulated data, and sends the first decapsulated data to the second system via the second bus interface.

The invention also provides a network-to-network bridge. In one embodiment, the network-to-network bridge, coupled between a first system and a second system, comprises a first network adapter, a plurality of second network adapters, and a routing adapter. The first network adapter comprises a first bus interface and a first network processing stack, and each of the plurality of second network adapters comprises a second bus interface and a second network processing stack. The routing arbitrator comprises a first routing network processing stack and a second routing network processing stack, wherein the first network processing stack is integrated with the first routing network processing stack, and the second network processing stack is integrated with the second routing network processing stack. The first bus interface receives a first data from the first system, and the first network processing stack encapsulates the first data as a first encapsulated data. The routing arbitrator obtains the first encapsulated data via the first network processing stack and the first routing network processing stack, and sends the first encapsulated data to one of the second network adaptors via the second network processing stack and the second routing network processing stack. The second network processing stack receiving the first encapsulated data takes the first encapsulated data as a first decapsulated data, and sends the first decapsulated data to the second system via the second bus interface of the second network adapter.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

To solve the problem of a low network transmission rate raised by the network access layer, a network system is provided by inserting a subsystem into a slot of a main system. The main system and the subsystem share a transport layer and an Internet layer but a network access layer is removed therebetween. A Peripheral Component Interconnect express (PCIe) bus with a high transmission rate is used to transfer data between the subsystem and the main system, such that a network access layer which is necessary in the conventional is therefore unnecessary for the main system and the subsystem of the invention, and the data transmission rate between the main system and the subsystem is therefore upgraded. The invention is further illustrated with FIGS. 3-7.

Figure 3A:
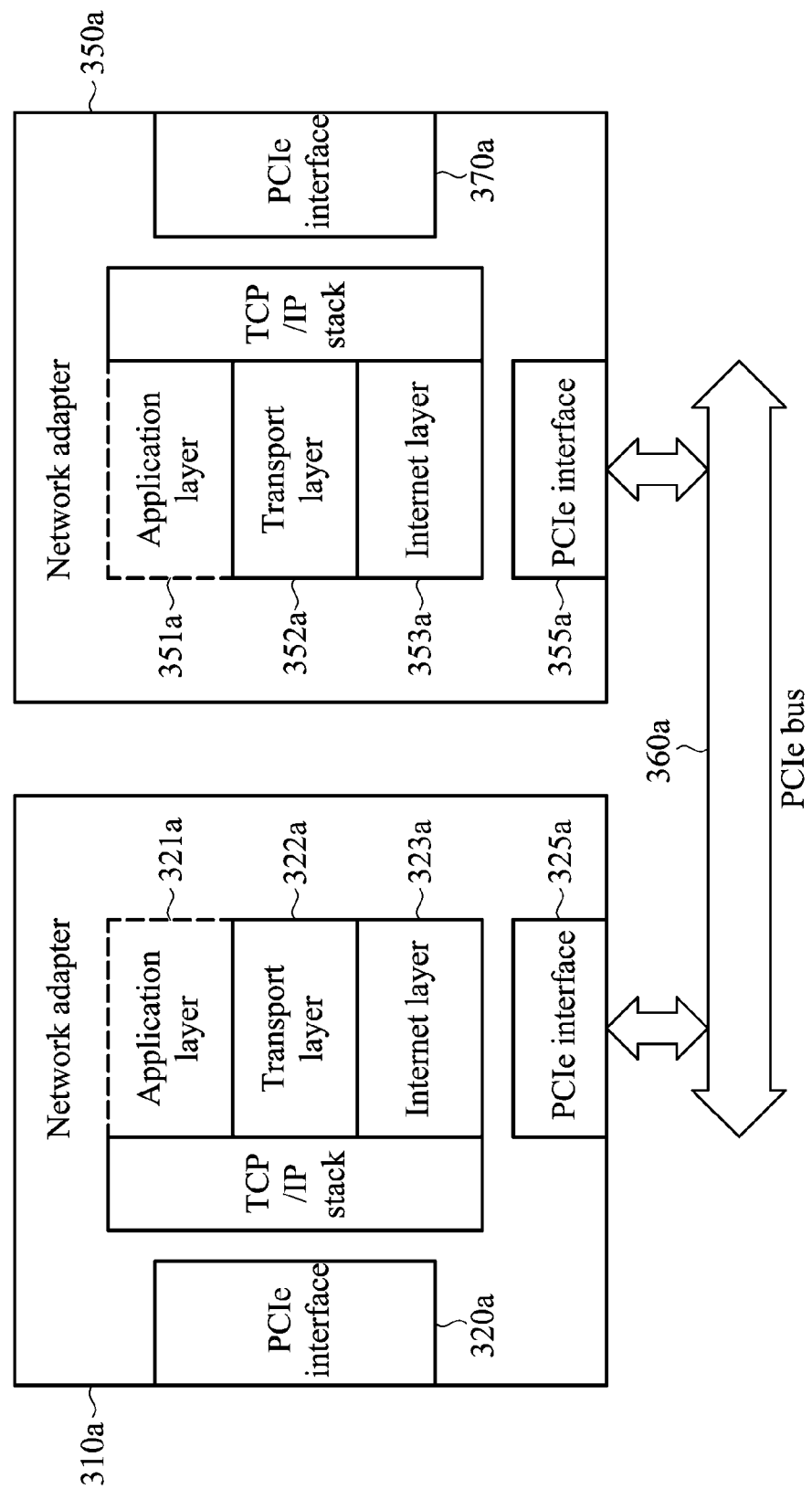
FIG. 3A is a block diagram of a network-to-network bridge with a one-to-one connection according to the invention.

Referring to FIG. 3A, a block diagram of a network-to-network bridge 300a with a one-to-one connection according to the invention is shown. A network adapter 310a is located on a motherboard of a main system, and a network adapter 350a is located on a motherboard of a subsystem. The motherboard of the subsystem is inserted to a slot of the motherboard of the main system, and the main system is therefore coupled with the subsystem via the PCIe interfaces 325a and 355a and a PCIe bus 360a. The network adapter 310a comprises a PCIe interface 320a coupled to a chipset of a main system and a network stack. The network adapter 350a comprises a PCIe interface 370a coupled to a chipset (not shown) of a subsystem and a TCP/IP stack. The TCP/IP stack of the network adapter 310a comprises a transport layer 322a and an Internet layer 323a, but does not comprise a network access layer (which is necessary for a conventional network adapter). The TCP/IP stack of the network adapter 350a comprises a PCIe interface 370a coupled to a chipset (not shown) of a subsystem, a transport layer 352a and an Internet layer 353a, but does not comprise a network access layer. Because the network adapter 310a couples to the network adapter 350a via the PCIe bus 360a to exchange data therebetween, a network access layer is unnecessary for the network adapters 310a and 350a, and the data transmission rate between the main system and the subsystem is significantly upgraded. In addition, when the network-to-network bridge 300a is coupled between the PCI-X buses or PCI buses of the main system and the sub-system, the PCIe interfaces 320a and 370a of the network adapters 310a and 350a can be replaced by PCI-X interfaces or PCI interfaces. In addition, although the network is illustrated under an Ethernet structure, all network structures similar to Ethernet's may be used in the invention.

When a main system wants to transmit a first data (such as a service request from a client) to a subsystem, the transport layer 322a and the Internet layer 323a first encapsulates the first data as a first encapsulated data. Please note the first data comprises data encapsulated according to definition of application layer 321 of TCP/IP model already, such that the application layer 321a is illustrated with a dotted line in FIG. 3a (to indicate that the network adapter 310a does not include the application layer 321). The first encapsulated data is then sent to the PCIe interface 355a via the PCIe interface 325a and the PCIe bus 360a. After the network adapter 350a receives the first encapsulated data, the network adapter 350a decapsulates the first encapsulated data by following definitions of the Internet layer 353a and the transport layer 352a and derive a first decapsulated data. The first decapsulated data is then sent via the PCIe interface 370a to a chipset and CPU of the subsystem for further processing (e.g., trying to reply the client request).

After the subsystem processes the first decapsulated data, the subsystem generates a second data as a processed result and then sends it to the network adapter 350a of the subsystem. The second data comprises data encapsulated according to the application layer 351a of TCP/IP model already, such that the application layer 351a is illustrated with a dotted line in FIG. 3a (to indicate that the network adapter 350a does not include the application layer 321). The transport layer 352a and the Internet layer 353a then encapsulate the second data as a second encapsulated data. The second encapsulated data is then sent to the PCIe interface 325a via the PCIe interface 355a and the PCIe bus 360a. After the network adapter 310a receives the second encapsulated data, the network adapter 310a decapsulates the second encoded data by following definitions of the Internet layer 323a and the transport layer 322a and then derives a second decapsulated data. The second decapsulated data is then sent via the PCIe interface 320a to a chipset and CPU of the main system for further processing.

The main system and the subsystem respectively have network adapters 310a and 350a, and are capable of rapidly transmit therebetween. However, if the network adapters 310a and 350a are further integrated into a single chip, for example, the network adapter 310a share information with the network adapter 350a so as to eliminate aforementioned encapsulating/decapsulating operations necessary in the conventional, totally employed chip number may be further reduced.

Figure 3B:
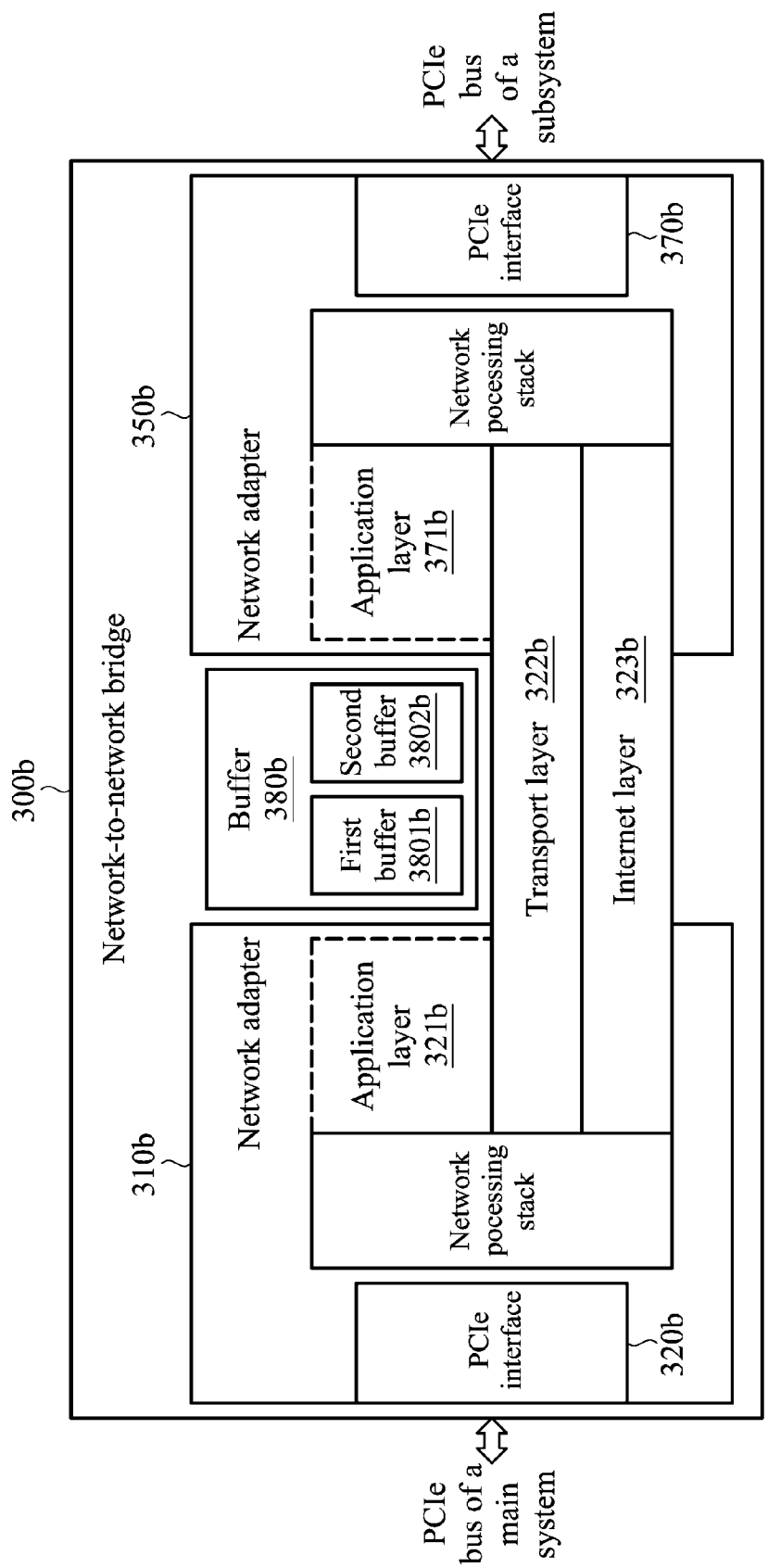
FIG. 3B is a block diagram of another embodiment of a network-to-network bridge with a one-to-one connection according to the invention.

Referring to FIG. 3B, a block diagram of another embodiment of a network-to-network bridge 300b with a one-to-one connection according to the invention is shown. The network-to-network bridge 300b integrates both the network adapters of a main system and a subsystem into a single chip, and the network-to-network bridge 300b is coupled between a PCIe bus of the main system and a PCIe bus of the subsystem. The network-to-network bridge 300b comprises network adapters 310b and 350b, while the network adapter 310b comprises a PCIe interface 320b and a network processing stack (such as TCP/IP stack), and the network adapter 350b comprises a PCIe interface 370b and a network processing stack (e.g., TCP/IP stack). In one embodiment, the network processing stack of the network adapter 310b comprises a transport layer 322b and an Internet layer 323b, but without a network access layer. The transport layer and the Internet layer of the network adapter 350b are respectively integrated with the transport layer and the Internet layer of the network adapter 310b. Because the transport layers and the Internet layers of the network adapters 310b and 350b are respectively integrated and the network adapters 310b and 350b do not comprise a network access layer, the network adapters 310b and 350b may exchange data with by following the PCIe standard so as to significantly increase the data transmission rate between the main system and the subsystem. In addition, when PCI-X buses or PCI buses of the is employed to couple the main system and the subsystem, the PCIe interfaces 320b and 370b of the network adapters 310b and 350b can be replaced by PCI-X interfaces or PCI interfaces. In addition, although the network is illustrated with under Ethernet structure, all network structures similar to Ethernet's may be used in the invention.

Each computer system coupled to a network has a unique Media Access Control (MAC) address. The MAC address of the main system is accessed and then stored in the buffer 380b, which is readable by the network adapter 310b, when the main system starts up. Similarly, the MAC address of the subsystem is accessed and then stored in the buffer 380b which is readable by the network adapter 350b when the subsystem starts up. The network adapters 310b and 350b may then analyze data packets to determine whether the data packets are to be sent to the main system or the subsystem. Please note that all manufacturers of network adapters have to do is to amend related drivers to incorporate the above functions in drivers of their network adapters. However, the application layer and the application programs above the transport layer 322b are not aware of the fact that a network access layer has been removed from the network-to-network bridge 300b, such that developers of software programs are irrelevant to the situation of the network processing stacks of the network adapters 310b and 350b.

The network-to-network bridge 300b receives a third data from a PCIe bus of a main system via the PCIe interface 320b. The third data comprises encapsulated data of the application layer 321b of TCP/IP model already, such that the application layer 321b is illustrated with a dotted line in FIG. 3b (to indicate the network adapter does not include this application layer 321b). The transport layer 322b and the Internet layer 323b then encapsulate the third data as a third encapsulated data as their definitions, respectively. Because the network adapter 310b and 350b share the transport layer 322b and the Internet layer 323b, the network adapter 310b may store the third encapsulated data in a first buffer 3801b of the buffer 380b. The network adapter 350b may directly access the third encapsulated data from the first buffer 3801b if the address of the buffer 3801b indicative of where the third encapsulated data is store is aware by the network adapter 350b. Please note the third encapsulated data is a decapsulated result of the Internet layer 323b and the transport layer 322b, therefore the network adapter 350b may directly take the third encapsulated data as required third decapsulated data, and sends the third decapsulated data to the subsystem via the PCIe interface 370b. Obviously, the network adapter 350b does not need to perform any packet decapsulating operation to the third encapsulated data (by accessing it from the first buffer 3801b as instead), and that the high-speed PCIe bus being used to transport data does significantly upgrade the performance of the network-to-network bridge 300b. In one embodiment, the buffer 380b storing the third encapsulated data can be replaced by registers, data queues, or other storage devices used for storing data. In one embodiment, both of the encapsulated results of the transport layer 322b and the Internet layer 323b may be simultaneously stored in the first buffer 3801b if necessary. In yet another embodiment, only the encapsulated result of the transport layer 322b is stored in the buffer 380b. Therefore, the third encapsulated data (i.e., the encapsulated result of transport layer 322b and the Internet layer 323b) may be treated (from the first buffer 3801b) as the third decapsulated data such that the transport layer 322b and the Internet layer 323b may directly retrieve the encapsulated results from the buffer 380b without performing any additional packet decapsulated.

Next, the network-to-network bridge 300b receives a fourth data from a PCIe bus of a subsystem via the PCIe interface 370b is illustrated. Please note that the fourth data comprises encapsulated data of the application layer 371b of TCP/IP model already, such that the application layer 371b is illustrated with a dotted line in FIG. 3b (also indicating the network adapter 350 does not include the application layer 371). The transport layer 322b and the Internet layer 323b encapsulate the fourth data as a fourth encapsulated data and then store the fourth encapsulated data into the second buffer 3802b. Because the network adapter 310b and 350b share the transport layer 322b and the Internet layer 323b, the network adapter 310b may directly access the fourth encapsulated data from the second buffer 3802b if the network adapter 310 is aware of the address of the second buffer 3802b indicative of where the fourth encapsulated data is stored. Please note the fourth encapsulated data is also a decapsulated result of the Internet layer 323b and the transport layer 322b, such that the network adapter 310b may directly take the fourth encapsulated data as fourth decapsulated data and then sends the fourth decapsulated data to the main system via the PCIe interface 320b after accessing from the second buffer 3802b. Obviously, the network adapter 310b does not perform any packet decapsulating operation, and the performance of the network-to-network bridge 300b will be significantly upgraded by using the high-speed PCIe buses. Similarly, the buffer 3802b used for storing the fourth encapsulated data may be substituted by registers, data queues, or any storage device. In addition, both of the encapsulated results of the transport layer 322b and the Internet layer 323b may be simultaneously stored into the buffer 3802b if necessary. In one embodiment, the fourth encapsulated data (i.e., the encapsulated result of transport layer 322b and the Internet layer 323b) may be treated as the fourth decapsulated result such that the transport layer 322b and the Internet layer 323b may directly retrieve it from the second buffer 3802b and as the decapsulated results without performing any additional packet decapsulating operation.

Although the buffer 380b shown in FIG. 3B is divided into the first buffer 3801b and the second buffer 3802b to respectively store the data sent from the main system to the subsystem and the data sent from the subsystem to the main system, the first buffer 3801b and the second buffer 3802b may be incorporated as a single buffer, and the data sent from the main system to the subsystem may be distinguished from the data sent from the subsystem to the main system according to different buffer address pointers. The network adapters 310b and 350b may then access data from the buffer 380b according to these pointers. In addition, the operations of the network adapters 310b and 350b are implemented by executing predetermined control codes for a microprocessor, and the control codes may be stored in a nonvolatile memory (such as a flash memory) as requirements. Detailed descriptions of them are eliminated because they are well-known technologies by skilled persons of the invention.

Figure 4B:
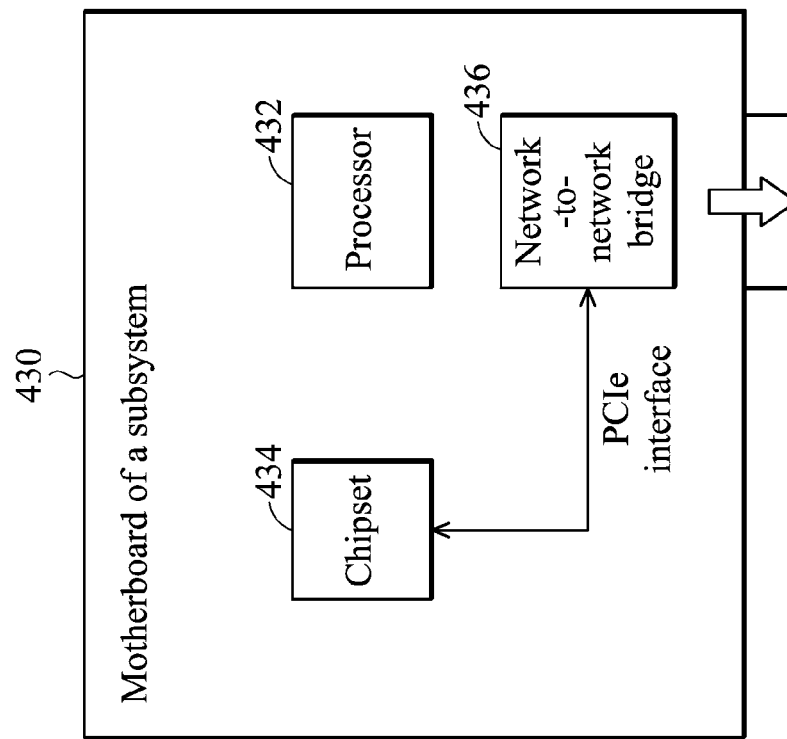
FIG. 4B is a schematic diagram of a motherboard of a subsystem according to the invention.
Figure 4A:
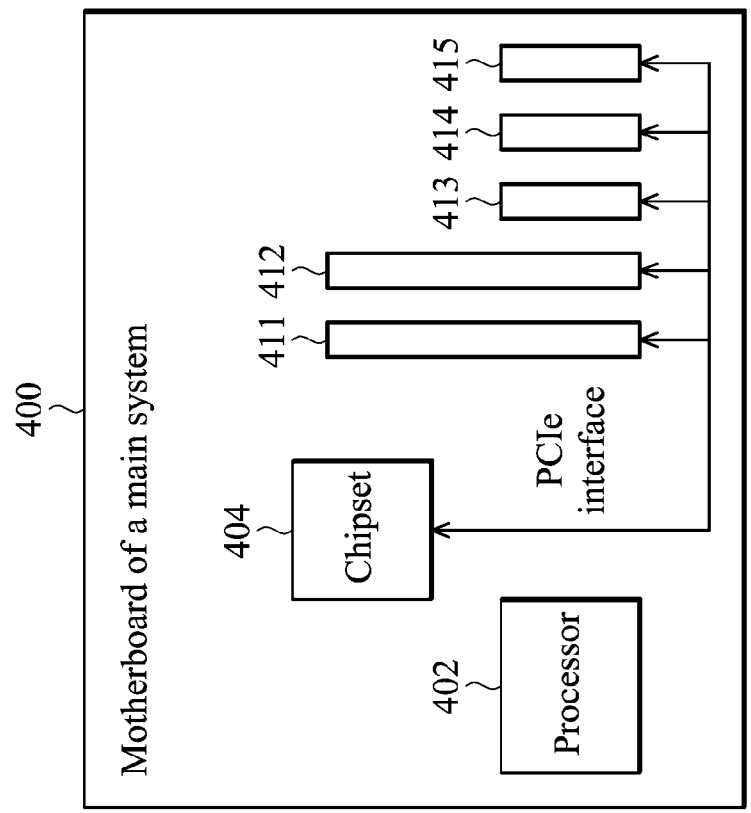
FIG. 4A is a schematic diagram of a motherboard of a main system according to the invention.
Figure 4C:
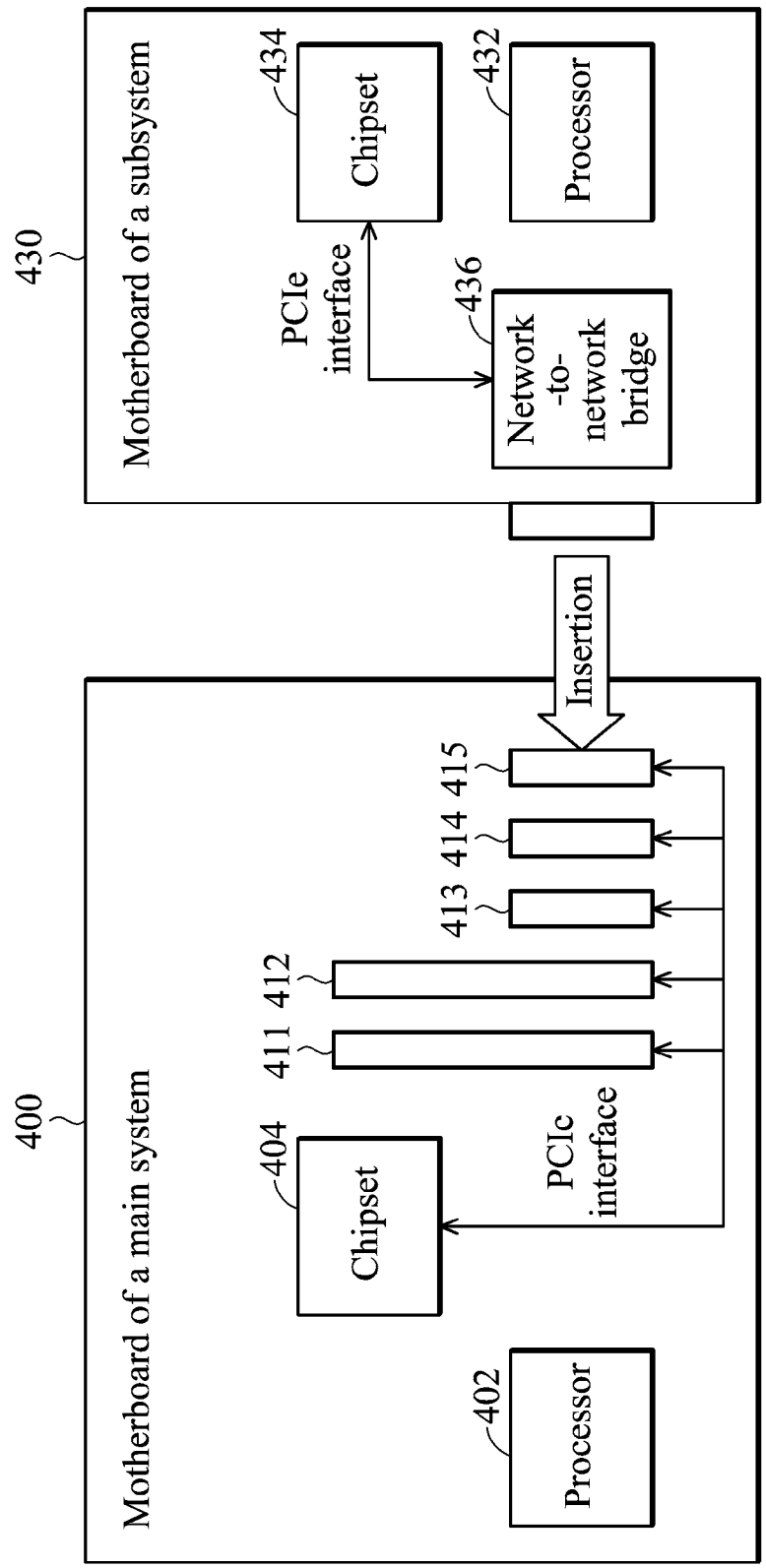
FIG. 4C is a schematic diagram of a motherboard of a main system connected to a motherboard connected to a subsystem according to the invention.

Referring to FIG. 4A, a schematic diagram of a motherboard 400 of a main system according to the invention is shown, wherein the network-to-network bridge 300 is allocated in the subsystem. The motherboard 400 of the main system comprises a processor 402, a chipset 404, and a plurality of slots 411~415, wherein the slots 411~415 are coupled to the chipset 404 via a PCIe bus. Referring to FIG. 4B, a schematic diagram of a motherboard 430 of a subsystem according to the invention is shown. The motherboard 430 of the subsystem comprises a processor 432, a chipset 434, and a network-to-network bridge 436, wherein a PCIe bus is coupled between the network-to-network bridge 436 and the chipset 434. The network-to-network bridge 436 shown in FIG. 4B is the network-to-network bridge 300b shown in FIG. 3B. Referring to FIG. 4C, a schematic diagram of a motherboard 400 of a main system coupled to a motherboard 430 of the subsystem according to the invention is shown. The motherboard 430 of the subsystem is inserted to one of the slots 411~415 of the motherboard 400 of the main system, such that the motherboard 400 of the main system is therefore coupled to the motherboard 430 of the subsystem. The data sent from the chipset 404 of the main system is therefore sent to the network-to-network bridge 436 of the subsystem via one of the slots 411~415. After the network-to-network bridge 436 encapsulates the data, the encapsulated result is directly taken as the decapsulated result of the subsystem and then sent to the chipset 434 of the subsystem via the PCIe bus. In addition, the data sent from the chipset 434 of the subsystem is transmitted to the network-to-network bridge 436 via the PCIe bus. After the network-to-network bridge 436 encapsulates the data, the encapsulated result is directly taken as the decapsulated result of the main system and then sent to the chipset 404 of the main system via the PCIe bus. According to the conventional art, an encapsulated result is further encapsulated by a network access layer and then sent via a network to the subsystem, while the subsystem then decapsulates the received data packets by using a network access layer, an Internet layer, and a transport layer sequentially. In comparison to the conventional art, the data transmission between the main system 400 and the subsystem 430 shown in FIG. 4 is significantly faster than that of the conventional.

Figure 1A:
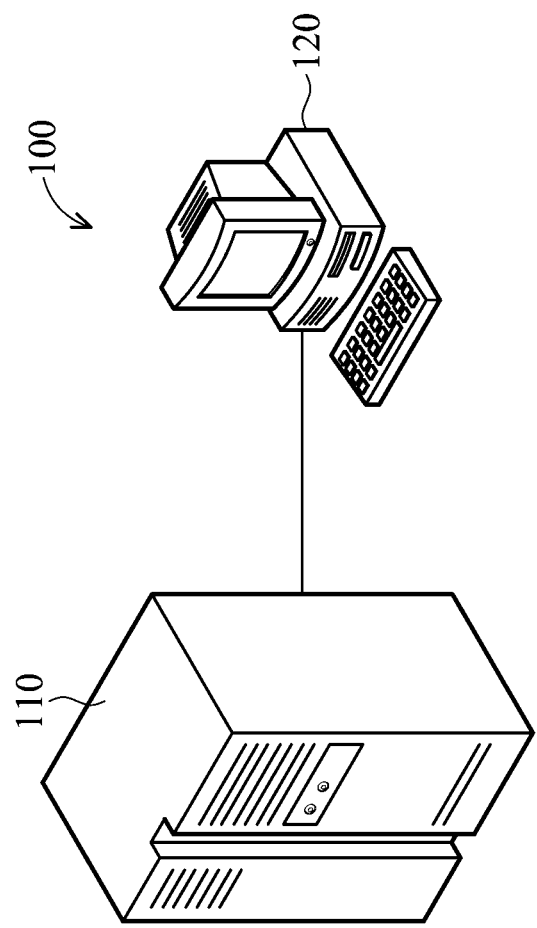
FIG. 1A is a schematic diagram of a computer system and a server with a one-to-one connection.
Figure 1B:
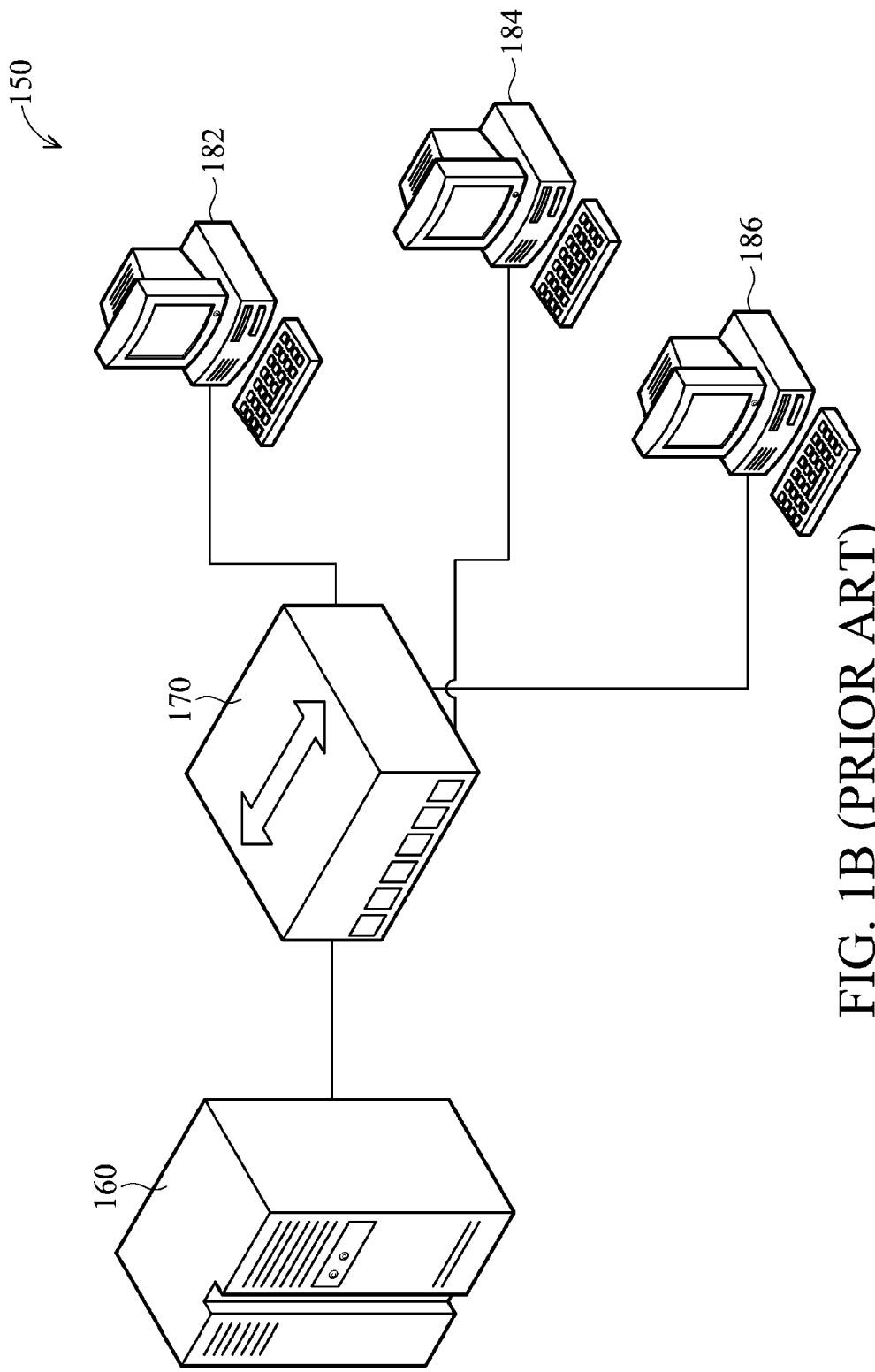
FIG. 1B is a schematic diagram of a plurality of computer systems and a server with a one-to-multiple connection.
Figure 2:
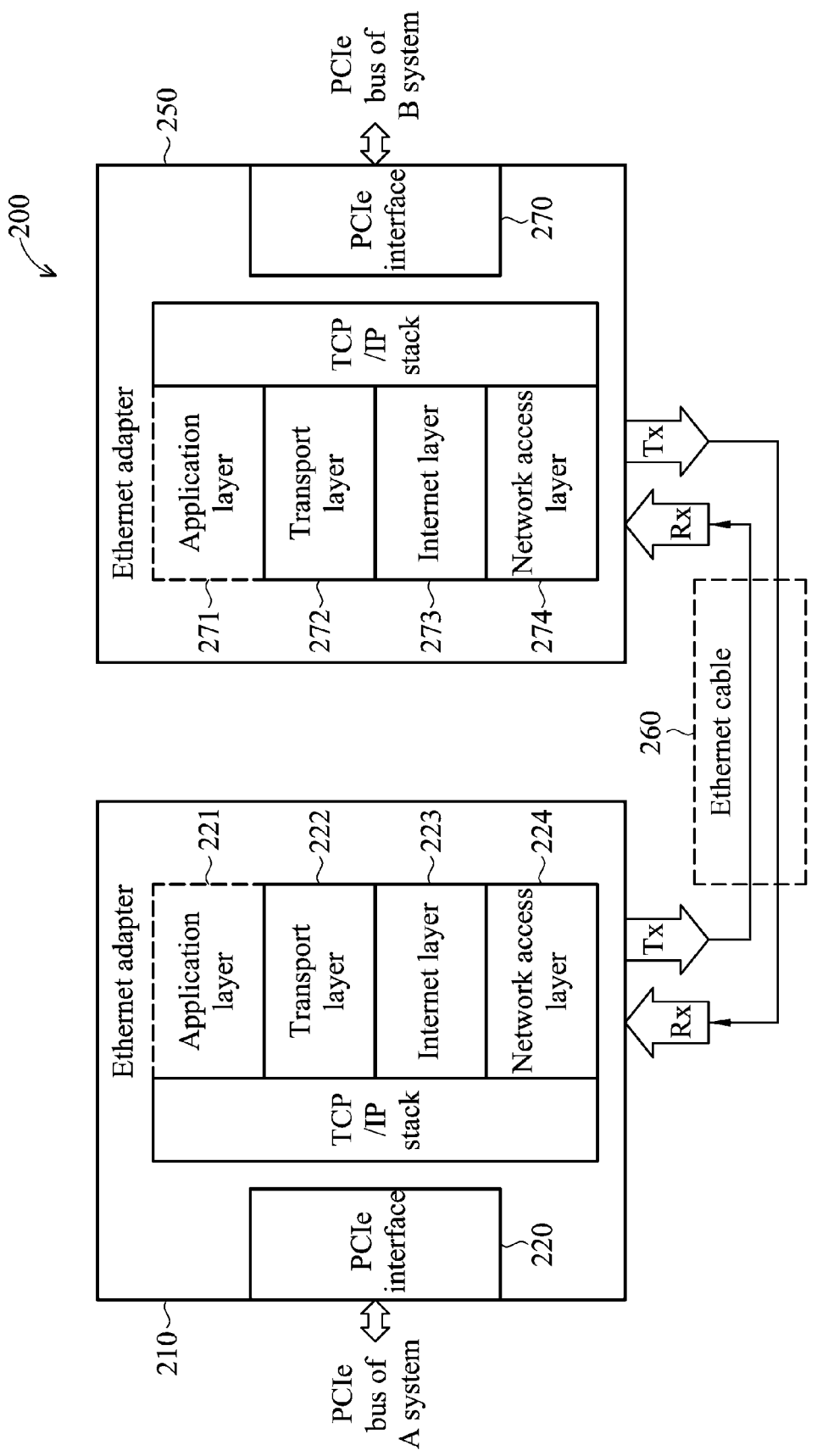
FIG. 2 is a schematic diagram of network adapters on two terminals of a network connection.

In addition, FIGS. 4A-4B show the situation the motherboard 430 of the subsystem is inserted to a slot of the motherboard 400 of the main system, which is similar to that of a network interface card inserts into the main system. Please note that a conventional network interface card usually records a unique MAC address used for encapsulating/decapsulating network packets. However, the subsystem of the invention records at least two MAC addresses (one is MAC address of the main system and the remaining is MAC address of the subsystem), and is capable of handling more complex functions than a conventional network interface case (such as manipulating data, e.g., a client request, delivered from the main system) because the functions of the subsystem is totally the same as that of a general purpose computer system. And, hardware structure shown in FIGS. 4A-4C is simpler than the conventional server systems (e.g., the structure shown in FIG. 1B) due to the removal of the Ethernet network and the usage of PCIe buses for data transmissions. In addition, each subsystem of FIG. 4C has a network-to-network bridge 436 which records the MAC addresses of the main system and the corresponding subsystem. If a plurality of subsystems are inserted in the slots 411~415 of the motherboard 400 of the main system, all the subsystems will receive data sent from the main system via the slots 411~415. If a subsystem finds the received data is assigned to itself after analyses by its network processing stacks, the network processing stack of the subsystem encapsulate the received data (by using associated Internet layer and) as the decapsulated transport layer) data and sends it to the subsystem for further processing (as described aforementioned). The flow the subsystem transfer a response data back to the main system after manipulating the decapsulated data (i.e., the received data) is also described as aforementioned. For example, when the response data is fed back from the subsystem to the main system, the network-to-network bridge 436 stores the response data into a buffer (e.g., data queue) on the motherboard 400 of the main system via the PCIe interface 320b and slots 411-415, and the chipset 404 of the main system then accesses the response data from the buffer. In one embodiment, the network-to-network bridge 436 may be installed on the main system. Related descriptions are given in accompanied in FIG. 6 later.

Figure 5:
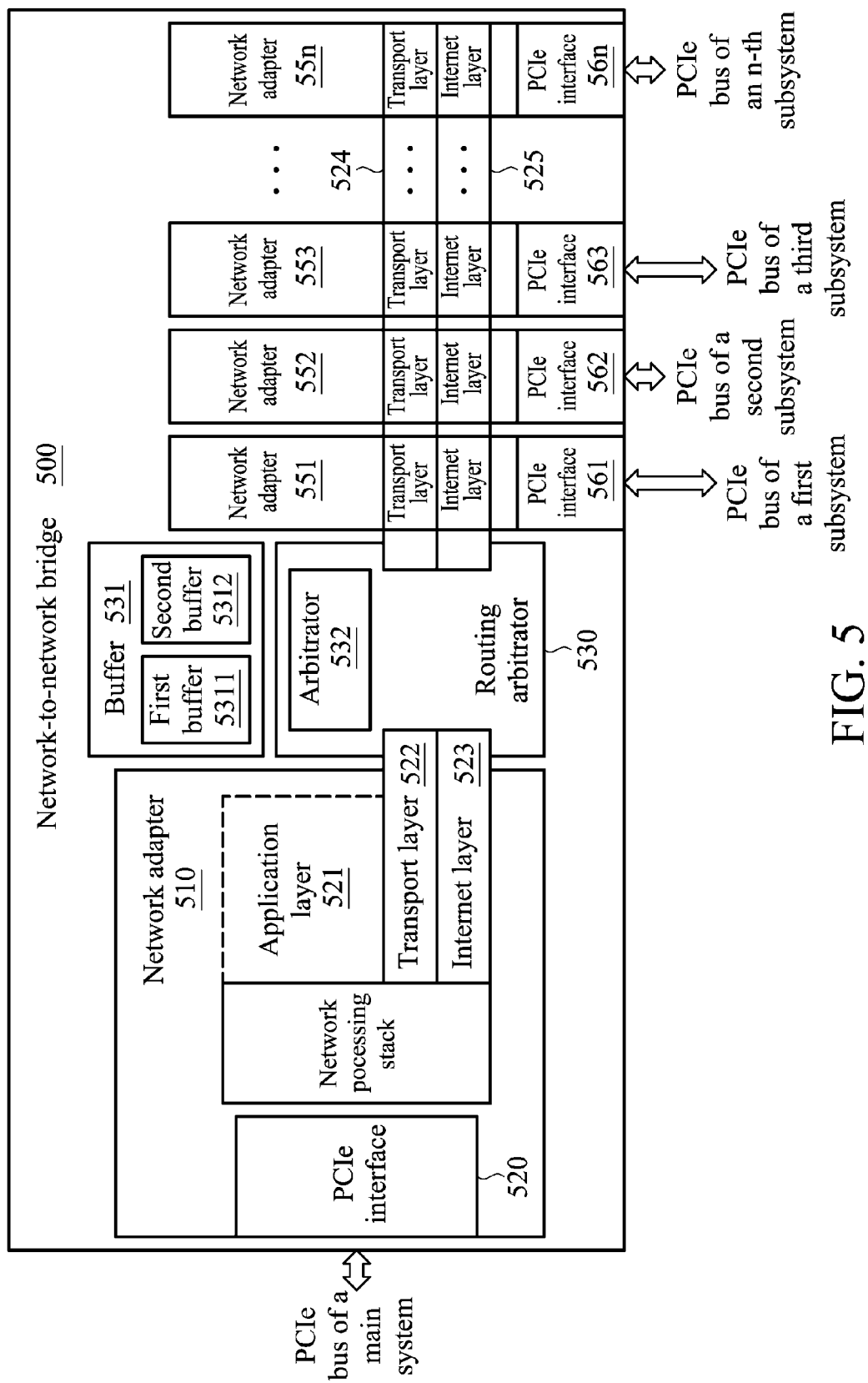
FIG. 5 is a block diagram of a network-to-network bridge with a one-to-multiple connection according to the invention.

Referring to FIG. 5, a block diagram of a network-to-network bridge 500 with a one-to-multiple connection according to the invention is shown. In one embodiment, the network-to-network bridge 500 is integrated into a single chip, and is coupled between a PCIe bus of a main system and PCIe buses of a plurality of subsystems. As shown in FIG. 5, the network-to-network bridge 500 comprises network adapters 510, 551, 552, ..., 55n and a routing arbitrator 530. The network adapter 510 comprises a PCIe interface 520 and network processing stacks 521~523. Similarly, the network adapters 551, 552, ..., 55n respectively comprises PCIE interfaces 561, 562, ..., 56n, and corresponding network processing stacks. The routing arbitrator 530 comprises a buffer 531 and an arbitrator 532. The network processing stacks of the network adapters 510, 551~55n, respectively comprising a transport layer and an Internet layer, but not comprising a network access layer. The network processing stacks 521~523 do not comprise an application layer (according to the definition of TCP/IP model) because data related to application layer is not processed therein.

When the network adapter 510 receives a fifth data (such as a service request from a client) from a main system via a PCIe interface 520, the transport layer 522 and the Internet layer 523 encapsulate the fifth data as a fifth encapsulated data. Because the network adapter 510 and the routing arbitrator 530 share the transport layer 522 and the Internet layer 523, the network adapter 510 firstly stores the fifth encapsulated data in a first buffer 5311 of the buffer 531. Next the routing arbitrator 530 directly accesses the fifth encapsulated data from the first buffer 5311, and takes the fifth encapsulated data as a fifth decapsulated data. Then, the routing arbitrator 530 sends the fifth decapsulated data to the network adapters 551~55n for further processing. In one embodiment, the routing arbitrator may inform the network adapters 551~55n to access the fifth decapsulated data in accompanied with the address indicative of where the fifth decapsulated data is stored in the first buffer 5311 such that the network adapters may be aware of where to access the fifth decapsulated data. Because the network adapters 551~55n and the routing arbitrator 530 share the transport layer 524 and the Internet layer 525, after the routing arbitrator 530 retrieves the fifth encapsulated data from the first buffer 5311 (or be aware of the address where the fifth decapsulated data is stored), the transport layer 524 and the Internet layer 525 may take the fifth encapsulated data as a fifth decapsulated data directly. After the fifth decapsulated data is analyzed, if the fifth decapsulated data is sent to one of the network adapters 551~55n, the fifth decapsulated data is transmitted to a chipset and CPU of a target subsystem via a corresponding PCIe interface. Please note the application layer 521 shown in FIG. 5 is also illustrated with a dotted line because the data related to the application layer 521 has been encapsulated in the fifth data already, such that the network adapters 551~55n do not perform any packet decapsulating operation, as the network adapters 310b/350b do. Additionally, the high-speed PCIe buses are used to transport data so as to upgrade performance of whole the server system. In one embodiment, both of the encapsulated results of the transport layer 522 and the Internet layer 523 may also be stored to the first buffer 5311 if necessary. When the encapsulated results of the transport layer 522 and the Internet layer 523 are taken as the fifth encapsulated data, the transport layer 522 and the Internet layer 523 may directly retrieve the encapsulated results from the buffer 5311 without performing any additional packet decapsulating operation.

When a subsystem (i.e., a computer system coupling with network adapter 551~55n) wants to send a sixth data to the main system (e.g., response data relating to a client request), one of the PCIe interfaces 561~56n of the network adapters 551~55n receives the sixth data from the PCIe bus of this subsystem. For example, if the target subsystem is a computer system associated with the network adapter 522, it will transfer this sixth data by means of PCIe interface 562 to the network adapter 522. Next, the transport layer 524 and the Internet layer 525 then encapsulate the sixth data as a sixth encapsulated data. Because the network adapters 551~55n and the routing arbitrator 530 share the transport layer 524 and the Internet layer 525, the network adapters 551~55n may store the sixth encapsulated data in registers or a buffer being aware by the routing arbitrator 530. For example, this sixth encapsulated data may be stored in a second buffer 5312 of the buffer 531, which is storage with the special purpose of storing data transferring back to the main system. Please note that the sixth encapsulated data is the just decapsulated result derived by the transport layer 522 and the Internet layer 523 after decapsulating this sixth encapsulated data, such that the routing arbitrator 530 may inform the network adapter 510 to access the sixth encapsulated data from the second buffer 5312 if the routing arbitrator 530 finds this sixth encapsulated data is sent to the main system after analyses. In one embodiment, the routing arbitrator may be informed by one of the network adapters 551~55n to access the sixth encapsulated data in accompanied with the address indicative of where the six encapsulated data is stored in the second buffer 5312 such that the routing arbitrator 530 may be aware of where to access the six encapsulated data. Next, because the routing arbitrator 530 and the network adapter 510 share the transport layer 522 and the Internet layer 523, the network adapter 510 then directly takes the sixth encapsulated data as sixth decapsulated data after accessing, and sends the sixth decapsulated data to the main system. The network adapter 510 therefore does not perform any additional packet decapsulating operation, and the performance of the data transmission is significantly upgraded because the sixth encapsulated/decapsulated data are both transmitted by means of the high-speed PCIe buses. In addition, both of the encapsulated results of the transport layer 524 and the Internet layer 525 may be stored to the second buffer 5312 if necessary. When the encapsulated results of the transport layer 524 and the Internet layer 525 are taken as the sixth decapsulated data, the transport layer 524 and the Internet layer 525 may directly retrieve the encapsulated results from the buffer 5312 without performing any additional packet decapsulating operation.

In one embodiment, the second buffer 5312 may be further divided into n areas for respectively storing data sent from the network adapters 551~55n to the main system, while the first buffer 5311 may be further divided into n areas for respectively storing data sent from the main system to the network adapters 551~55n. In addition, although the buffer 531 shown in FIG. 5 is divided into a first buffer 5311 and a second buffer 5312 to respectively store the data sent from the main system to the subsystem and the data sent from the subsystem to the main system, the first buffer 5311 and the second buffer 5312 may be incorporated into a single buffer, and the data sent from the main system to the subsystem are distinguished from the data sent from the subsystem to the main system according to different address of the buffer 531. The network adapters 510 and 551-55n may access data from the buffer 531 according to these pointers. In addition, the operations of the network switches 510 and 551-55n are implemented by executing predetermined control codes for a microprocessor, and the control codes may be stored in a nonvolatile memory (such as a flash memory) as requirements. Detailed descriptions of them are also eliminated because they are well-known technologies for those skilled persons of the invention. Additionally, all software or programs relating to system services may need no amendment because the routing arbitrator 530 only takes the responsibility of system services (e.g., DHCP), which is nonrelated to the network access layer.

Figure 6:
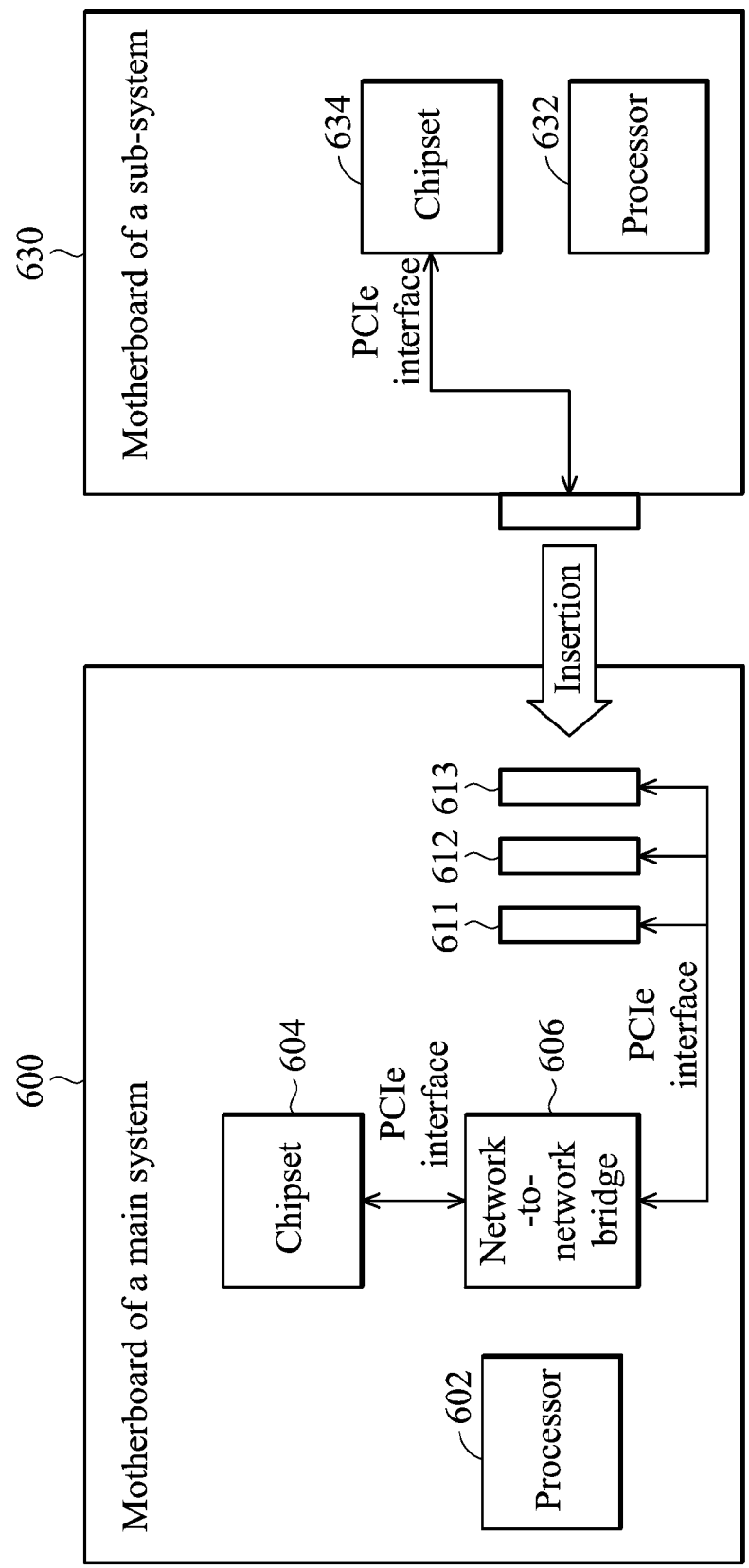
FIG. 6 is a schematic diagram of a motherboard of a main system and a motherboard of a subsystem according to the invention.

Referring to FIG. 6, a schematic diagram of a motherboard 600 of a main system and a motherboard 630 of a subsystem according to the invention is shown. The motherboard 600 of the main system comprises a processor 602, a chipset 604, a network-to-network bridge 606, and a plurality of slots 611~613. The slots 611~613 are coupled to the network-to-network bridge 606 via a PCIe bus, and the network-to-network bridge 606 is coupled to the chipset 604 via a PCIe bus. The network-to-network bridge 606 is a network-to-network bridge 500 with a one-to-multiple connection shown in FIG. 5. The motherboard 630 of the subsystem comprises a processor 632, a chipset 634, and a PCIe bus.

The motherboard 630 of the subsystem is inserted to a slot of the motherboard 600 of the main system so as to make the subsystem couple with the main system. The data sent by the chipset 604 of the main system may therefore be transmitted to the network-to-network bridge 606, and then the network-to-network bridge 606 encapsulates this data and then sends its encapsulated data to associated PCIe bus of the subsystem according to analysis result of the data. On the other hand, the chipset 634 of the subsystem may receive the encapsulated data sent by the main system via the PCIe bus. In addition, the data sent by the chipset 634 of the subsystem is transmitted via the PCIe bus to the slot, and the network-to-network bridge 606 may receive the data from the slot and then send the data to the chipset 604 of the main system after encapsulations and analyses. Therefore, data transmissions between the main system and the subsystem may follow a high-speed PCIe standard without any amendment to application software.

In addition, the motherboard 630 of the subsystem is inserted to a slot of the motherboard 600 of the main system, which is similar to an insertion of a network interface card into the main system. Differently, a conventional network interface card may record only one MAC address, but the network-to-network bridge 606 of the invention records at least two MAC addresses, one indicates the MAC address of the main system and the other shows the MAC address of the subsystem. Because the network-to-network bridge 606 acts as a network arbitrator, the network-to-network bridge 606 firstly analyze a data delivered from the main system and then realize which subsystem is the target for receiving this data. The network-to-network bridge 606 then encapsulates the data according to the MAC address of the subsystem and both the transport layer 522 and the Internet layer 523 and finally stores the encapsulated data to the first buffer 5311. Because the transport layer 522 and the Internet layer 523 are integrated and shared by the routing arbitrator 530 and the subsystem, the routing arbitrator 530 may determine which subsystem will receive the encapsulated data. The routing arbitrator 530 takes the encapsulated data as a decapsulated data, and then sends this encapsulated data to a buffer (e.g., data queue) of the target subsystem via associated PCIe interface. Please note the flow which the subsystem responds the main system is similar to descriptions for FIG. 5. Moreover, the subsystem merely delivers its response to the main system. That is, the subsystems will not communicate each other and exchange data mutually. On the other hand, when a response (e.g., the processing result of a client request) is fed back from the subsystem to the main system, the response data is sent to the routing arbitrator 530 via the PCIe interface, and the routing arbitrator 530 encapsulates the response data and stores associated encapsulated response data into the second buffer 5312 (e.g., a data queue). The network adapter 510 then retrieves the response data from the second buffer 5312 and then sends the response data to the chipset of the main system for further processing.

Figure 7:
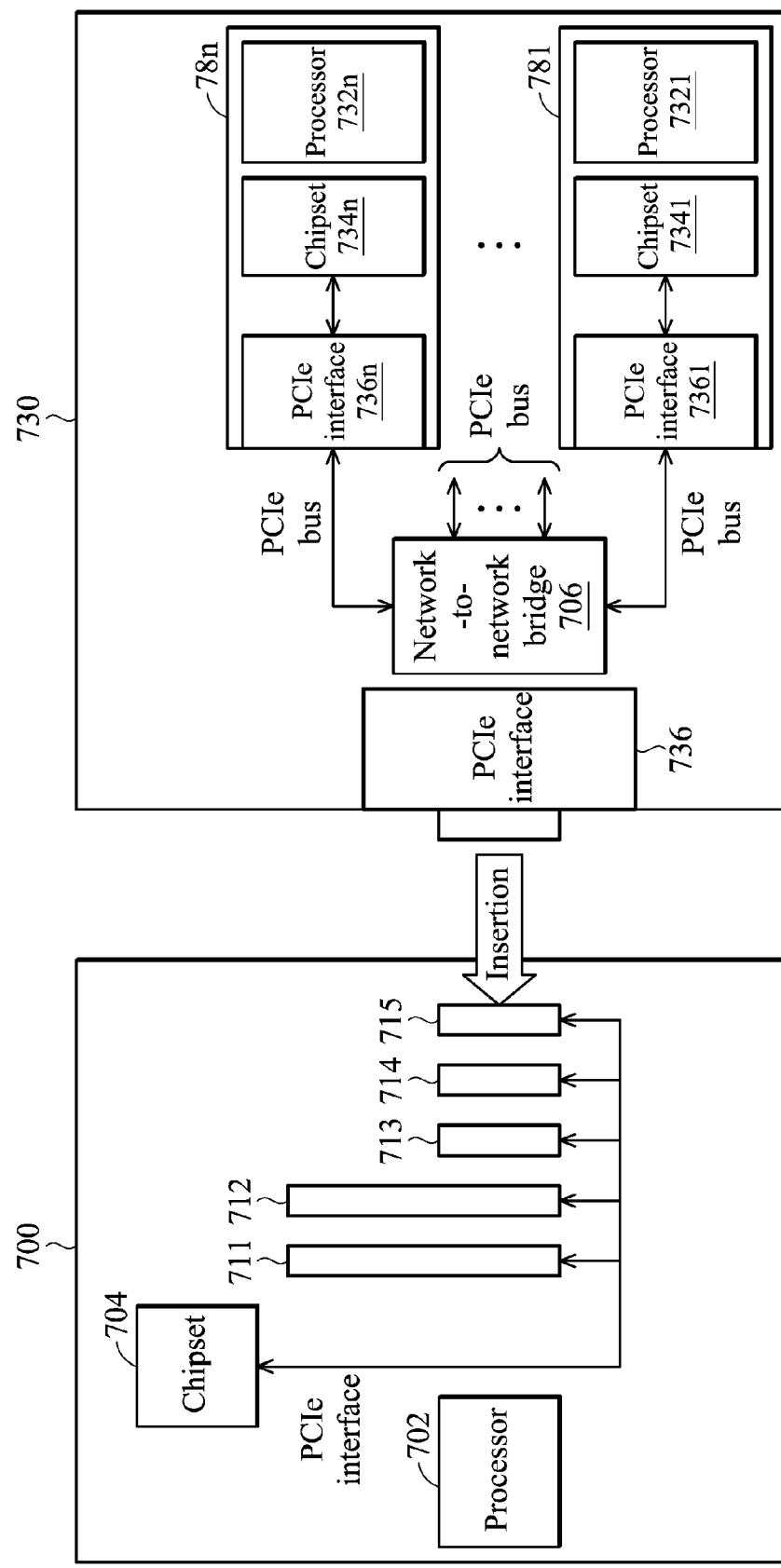
FIG. 7 is a schematic diagram of a motherboard of a main system and a motherboard of a subsystem according to the invention.

Referring to FIG. 7, a schematic diagram of a motherboard 700 of a main system and a motherboard 730 of a subsystem according to the invention is shown. The motherboard 700 of the main system comprises a processor 702, a chipset 704, and a plurality of slots 711~713. The slots 711~713 is coupled to the chipset 704 via PCIe buses. The motherboard 730 of the subsystem comprises a lot of division subsystems, each further comprises a processor, a chipset, a network-to-network bridge 706, and a PCIe interface coupled to a PCIe bus of the motherboard 700 of the main system. For example, a division subsystem 781 comprises a processor 7321, a chipset 7341, a network-to-network bridge 7361, and a PCIe interface 736, and the other division subsystem comprises the same components as the division subsystem 781. Obviously, each of the division subsystems 781~78n is independently operating as a computer system. For example, the division subsystem 781 may receive data sent from the main system via the PCIe interface 736, the network-to-network bridge 706 and the PCIe interface 7361, and then this data is sent via the chipset 7341 to the processor 7321. A response is then sent from the division subsystem 781 via the PCIe interface 7361 back to the network-to-network bridge 706 and finally to the main system. Please note all detailed descriptions relating to operations of the network-to-network bridge 706 is eliminated because descriptions relating to FIG. 5 have illustrated how the shared transport layer and Internet layer work, how to analyze MAC addresses of the main system and subsystems, and how to access data from the first/second buffers, . . . , etc. Additionally, the main system and the subsystem (including division subsystems) may rapidly transmit data mutually by means of PCIe buses without any additional amendment to their software programs. The system shown in FIG. 7 is similar to that shown in FIG. 4C, but the subsystem shown in FIG. 7 comprises a plurality of division subsystems 781-78n which can be integrated to a single chip if necessary (and also depends on manufacturing processes). Practically, a plurality of subsystems 730 may be plugged into the slots 711~715 of the motherboard 700 of the main system so as to provide the main system more supports from the subsystems. Obviously, the processing capability of the main system is thus further significantly upgraded by the aids of more subsystems and the high-speed data-transmission PCIe buses, such that a server system may be powerful to support cloud computing applications with upgraded computational capabilities.

Please note any bus providing high-speed data-transmission capability may be employed in the present invention as a substitution of the PCIe bus. Additionally, any network processing stack used in computer system, which is capable of removing the network access layer and sharing transport and internet layers as described in the embodiments, such as sharing the transport layer and network layer but removing the physical layer in OSI model, may be used to replace the TCP/IP stacks shown in the embodiments. But, any amendment or modification within the spirits of the present invention should be included with the scopes of the following appended claims.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A network-to-network bridge, coupled between a first system and a second system, comprising:
  a first network adapter, comprising a first bus interface and a first network processing stack, wherein the first bus interface receives a first data from the first system, and the first network processing stack encapsulates the first data as a first encapsulated data; and
  a second network adapter, comprising a second bus interface and a second network processing stack, wherein the second network processing stack takes the first encapsulated data as first decapsulated data, and sends the first decapsulated data to the second system via the second bus interface;

wherein a transport layer of the first network processing stack is integrated with a transport layer of the second network processing stack, and an Internet layer of the first network processing stack is integrated with an Internet layer of the second network processing stack, wherein the first network processing stack and the second network processing stack do not comprise a network access layer.

2. The network-to-network bridge as claimed in claim 1, wherein the first network processing stack and the second network processing stack conform to the TCP/IP standard.

3. The network-to-network bridge as claimed in claim 1, wherein the first bus interface and the second bus interface conform to the Peripheral Component Interconnect express (PCIe) standard.

4. The network-to-network bridge as claimed in claim 1, further comprising a buffer for storing the first encapsulated data, wherein the first encapsulated data is stored in the buffer by the first network adapter, and the first encapsulated data is accessed from the buffer by the second network adapter.

5. The network-to-network bridge as claimed in claim 1, further comprising a storage device for storing Media Access Control (MAC) addresses of the first network processing stack and the second network processing stack.

6. The network-to-network bridge as claimed in claim 1, wherein the network-to-network bridge is integrated to a single chip.

7. A network-to-network bridge, coupled between a first system and a second system, comprising:
a first network adapter, comprising a first bus interface and a first network processing stack;
a plurality of second network adapters, each comprising a second bus interface and a second network processing stack, and
a routing arbitrator, comprising a first routing network processing stack and a second routing network processing stack, wherein the first network processing stack is integrated with the first routing network processing stack, and the second network processing stack is integrated with the second routing network processing stack,
wherein the first bus interface receives a first data from the first system, and the first network processing stack encapsulates the first data as a first encapsulated data,
wherein the routing arbitrator obtains the first encapsulated data via the first network processing stack and the first routing network processing stack, and sends the first encapsulated data to one of the second network adaptors via the second network processing stack and the second routing network processing stack, and
wherein the second network processing stack receiving the first encapsulated data takes the first encapsulated data as a first decapsulated data, and sends the first decapsulated data to the second system via the second bus interface of the second network adapter.

8. The network-to-network bridge as claimed in claim 7, wherein a transport layer of the first network processing stack is integrated with a transport layer of the first routing network processing stack, and an Internet layer of the first network processing stack is integrated with an Internet layer of the first routing network processing stack, wherein the first network processing stack and the first routing network processing stack do not comprise a network access layer.

9. The network-to-network bridge as claimed in claim 7, wherein a transport layer of the second network processing stack is integrated with a transport layer of the second routing network processing stack, and an Internet layer of the second network processing stack is integrated with an Internet layer of the second routing network processing stack, wherein the second network processing stack and the second routing network processing stack do not comprise a network access layer.

10. The network-to-network bridge as claimed in claim 9, wherein the first network processing stack and the first routing network processing stack conform to the TCP/IP standard.

11. The network-to-network bridge as claimed in claim 7, wherein the first bus interface and the second bus interface conform to the Peripheral Component Interconnect express (PCIe) standard.

12. The network-to-network bridge as claimed in claim 7, further comprising a buffer for storing first encoded data, wherein the first encapsulated data is stored in the buffer by the first network adapter, and the first encapsulated data is accessed from the buffer by a first routing network adapter.

13. The network-to-network bridge as claimed in claim 7, further comprising a storage device for storing Media Access Control (MAC) addresses of the first network processing stack and the second network processing stack.

14. The network-to-network bridge as claimed in claim 7, wherein the network-to-network bridge is integrated to a single chip.

* * * * *